2,904,397
PRODUCTION OF TITANIUM TETRAIODIDE

Morris L. Nielsen, Centerville, Ohio, assignor to Monsanto Chemical Company, St. Louis, Mo., a corporation of Delaware No Drawing. Application August 11, 1955
Serial No. 527,880

4 Claims. (Cl. 23—87)

This invention relates to a process for manufacturing titanium tetraiodide. More specifically, the invention relates to a particular method whereby free-flowing crystalline titanium tetraiodide can be produced.

It has now been found that titanium tetraiodide can be produced by reacting titanium tetrachloride and hydrogen iodide in an inert solvent and that very high yields of the tetraiodide can be crystallized from the reaction mixture as a free-flowing granular product of exceptionally high purity.

The reaction can be represented as follows:

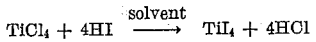

$$TiCl_4 + 4HI \xrightarrow{solvent} TiI_4 + 4HCl$$

It will be readily apparent that the present reaction can be carried out in a various number of ways. For example, titanium tetrachloride can be dissolved in the solvent (e.g., carbon tetrachloride) and gaseous hydrogen iodide bubbled through the solution until no more hydrogen chloride is evolved. The reaction mixture is then cooled to reduce the solubility of titanium tetraiodide and the resulting precipitate of titanium tetraiodide is separated by decantation, filtration and/or evaporation of the solvent. The crystalline titanium tetraiodide produced thereby is a free-flowing granular product.

The solvent utilized in the present invention must be one which is inert to both titanium tetrachloride and hydrogen iodide and is a liquid under the conditions of pressure and temperature used in the reaction. The solvent is preferably one which is liquid at atmospheric pressure and room temperatures, but more volatile solvents can be readily utilized under pressure, or higher melting point solvents can be used at elevated temperatures. Examples of suitable inert solvents are halogenated hydrocarbons, such as carbon tetrachloride, chloroform, iodoform, ethylene dibromide, sym-tetrachloroethane, 2,2-dichloropropane, 1,2,3,4-tetrachlorobutane, and higher aliphatic halogenated hydrocarbons; ortho- or metadichlorobenzene, ortho-, meta-, or para-chlorotoluene, chlorinated biphenyl derivatives such as the proprietary materials sold as various "Aroclors," and other halogenated aromatics; non-halogenated saturated hydrocarbons such as n-pentane, n-hexane, iso-octane, cyclohexane; non-halogenated aromatics, such as benzene, toluene, xylene, etc., and similar solvents which are substantially inert to hydrogen iodide.

The optimum amount of solvent to be used in the present invention will depend somewhat upon the temperature and pressure conditions under which the reaction is carried out, the rates and methods of introducing the reactants, the means for separating the product from the reaction mixture, and other factors equally within the knowledge of one skilled in the art. In general, this optimum amount of solvent will be such that the solvent is always present in excess (on a volume basis) of the amount of titanium tetrachloride present.

The reaction of titanium tetrachloride and hydrogen iodide is very rapid and exothermic, so cooling of the reaction mixture is desirable to keep the temperature down and thereby reduce the vaporization losses of titanium tetrachloride and solvent. If the temperature of the reaction mixture is kept low enough, sufficient titanium tetraiodide will precipitate during the reaction to give a good yield without further cooling after the reaction has been completed.

The reaction will go very readily even at quite low temperatures, e.g., −25° C. or lower. In general, it is preferred to carry out the reaction below about 30° or so. However, higher temperatures can be utilized, especially if the reaction chamber is pressurized to reduce losses of titanium tetrachloride and solvent vapors, or if other provisions are made for the recovery of these vapors.

The present process can conveniently be carried out continuously by introducing titanium tetrachloride and hydrogen iodide (molar proportions of about 1 to 4, respectively) into a solution saturated with respect to titanium tetraiodide, while maintaining the reaction mixture at substantially constant temperature. This procedure has the marked advantage that it is not necessary to cool the reaction mixture to very low temperatures in order to obtain high yields, since substantially one mole of titanium tetraiodide will be crystallized from solution for each mole of titanium tetrachloride introduced thereinto.

The following examples are presented as illustrative of the process of the present invention.

Example 1

One hundred milliliters of carbon tetrachloride (dried over barium oxide and filtered) and 13.8 ml. of titanium tetrachloride were placed together in a 250 ml. stirred flask maintained at about −25° C. in a tertachloroethylene-Dry Ice bath. Hydrogen iodide vapors were bubbled into the carbon tetrachloride-titanium tetrachloride solution (for about 2 hours and 15 minutes) until evolution of HCl vapors was no longer detectable. The reaction flask was then removed from the Dry Ice bath and allowed to come up to room temperature, after which the carbon tetrachloride was filtered off, leaving a moist crystalline product. The product was washed with three portions (100 ml. each) of carbon tetrachloride, and the residual carbon tetrachloride removed by evaporation under vacuum while warming the crystals in a flask immersed in a hot water bath. The resulting product (59.5 grams) was a free-flowing crystalline material analyzing 89.67 weight percent iodide (theoretical 91.38 weight percent), and only 0.95 weight percent chlorine. Evaporation of the carbon tetrachloride from the mother liquor resulted in recovery of about 10 grams of additional product, giving a substantially theoretical conversion of titanium tetrachloride to titanium tetraiodide.

Example 2

One hundred milliliters of benzene (dried over metallic sodium) and 13.5 ml. of titanium tetrachloride were placed together in a 250 ml. flask and stirred at room temperature (about 26° C.). About 64 grams of gaseous hydrogen iodide was bubbled into the solution over the course of about 1 hour. The resulting reaction mixture was distilled under reduced pressure (15 mm. Hg) to give a solid residue which after washing with hexane yielded 23 grams of crystalline titanium tetraiodide.

Example 3

Sixty milliliters of dry hexane and 13.5 ml. of titanium tetrachloride were placed together in a 250 ml. flask and stirred at about 29° C. About 86 grams of gaseous hydrogen iodide was bubbled into the solution over a course of about 1 hour and 10 minutes. The reaction mixture was then distilled, removing all material boiling below 138° C. at 25 ml. pressure. The residue was approximately 18 grams of crystalline titanium tetraiodide.

I claim:

1. The method of making free-flowing granular titanium tetraiodide, which method comprises continuously introducing hydrogen iodide and titanium tetrachloride in a molar ratio of 4:1, respectively, into a carbon tetrachloride solution saturated with respect to titanium tetraiodide while maintaining said solution at a substantially constant temperature, thereby continuously precipitating crystalline titanium tetraiodide from said solution.

2. The method of making free-flowing granular titanium tetraiodide, which method comprises introducing hydrogen iodide and titanium tetrachloride into an inert organic liquid solvent which is a solvent for said titanium tetrachloride and which is chemically inert to said hydrogen iodide and said titanium tetrachloride, allowing said iodide and said tetrachloride to react with each other in a 4:1 molar ratio to form titanium tetraiodide, and thereafter separating titanium tetraiodide as a crystalline solid from said solvent at conditions of temperature and concentration such that the amount of titanium tetraiodide present exceeds its solubility in said solvent.

3. The method of making free-flowing granular titanium tetraiodide, which method comprises introducing hydrogen iodide and titanium tetrachloride into an inert organic liquid solvent which is a solvent for said titanium tetrachloride and which is chemically inert to said hydrogen iodide and said titanium tetrachloride, said solvent being selected from the group consisting of halogenated hydrocarbons and non-halogenated saturated hydrocarbons, allowing said iodide and said tetrachloride to react with each other in a 4:1 molar ratio to form titanium tetraiodide, and thereafter separating titanium tetraiodide as a crystalline solid from said solvent at conditions of temperature and concentration such that the amount of titanium tetraiodide present exceeds its solubility in said solvent.

4. The method of making free-flowing granular titanium tetraiodide, which method comprises introducing hydrogen iodide and titanium tetrachloride into solution in carbon tetrachloride, allowing said hydrogen iodide and said titanium tetrachloride to react with each other in a 4:1 molar ratio to form titanium tetraiodide, and thereafter separating titanium tetraiodide as a crystalline solid from said carbon tetrachloride at conditions of temperature and concentration such that the amount of titanium tetraiodide present exceeds its solubility in said carbon tetrachloride.

References Cited in the file of this patent

UNITED STATES PATENTS

| 1,890,874 | Weston | Dec. 13, 1932 |
| 2,306,184 | Pechukas | Dec. 22, 1942 |
| 2,415,346 | Farr | Feb. 4, 1947 |

OTHER REFERENCES

"Handbook of Chemistry," by N. A. Lange, 1944, 5th ed., pp. 254–5, Handbook Publishers, Inc., Sandusky, Ohio.

J. W. Mellor's "A Comprehensive Treatise on Inorganic Chemistry," vol. 7, 1928 ed., p. 89, Longmans, Green and Co., N.Y.

"Titanium," by Jelks Barksdale, 1949 ed., p. 85, The Ronald Press Co., N. Y.

Zeitschrift für Anorganische Chemie, vol. 81 (1913), pp. 364–68.